United States Patent [19]
Sparks

[11] 3,806,573
[45] Apr. 23, 1974

[54] METHOD OF MAKING CLOTH REINFORCING MEMBER FOR TISSUE GRAFTS

[76] Inventor: Charles H. Sparks, 3725 S. E. Mortins St., Portland, Oreg. 97202

[22] Filed: June 29, 1972

[21] Appl. No.: 267,557

Related U.S. Application Data

[60] Division of Ser. No. 178,171, Sept. 7, 1971, Pat. No. 3,703,009, which is a division of Ser. No. 823,287, May 9, 1969, Pat. No. 3,625,198, which is a continuation-in-part of Ser. No. 655,838, July 25, 1967, Pat. No. 3,514,791.

[52] U.S. Cl.................. 264/137, 264/136, 264/292
[51] Int. Cl....................... B29d 23/01, B29d 27/00
[58] Field of Search..................... 264/137, 134–137

[56] References Cited
UNITED STATES PATENTS
2,995,781  8/1961  Sipler................................ 264/137
1,939,871  12/1933  Bedur............................ 264/231 X
3,337,673  8/1967  Jeckel................................ 264/324

Primary Examiner—Robert F. White
Assistant Examiner—Richard R. Kucia
Attorney, Agent, or Firm—Lee R. Schermerhorn

[57] ABSTRACT

Method for growing a graft structure, particularly in a patient's own body. A die cluster is disclosed comprising a plurality of dies for growing graft tubes whereby such graft tubes may be connected together end to end to make a tube of desired length. The invention further includes an improved method for implanting the die cluster in the body, an improved cloth reinforcing member for tissue grafts and method of preparing same.

1 Claim, 13 Drawing Figures

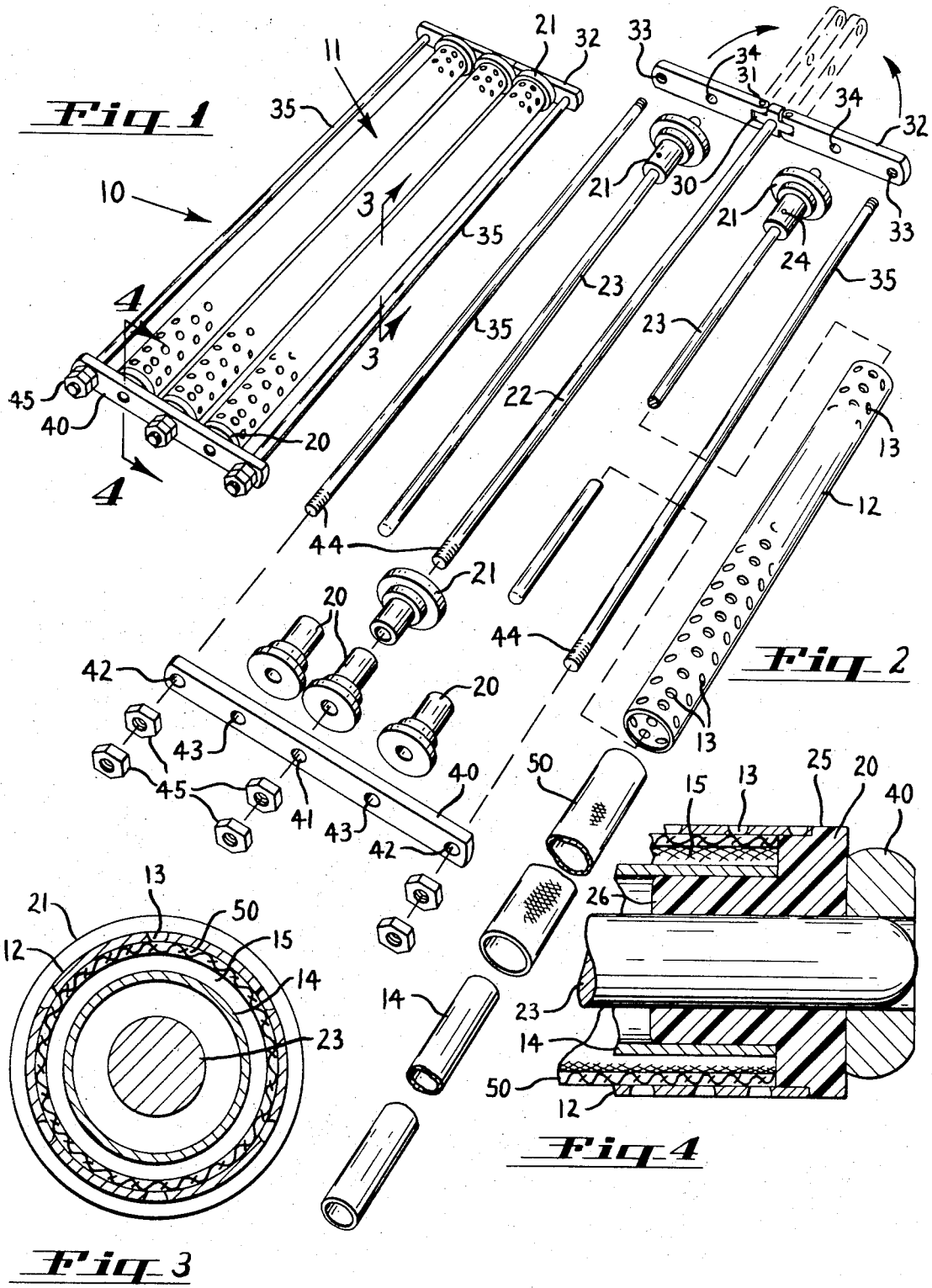

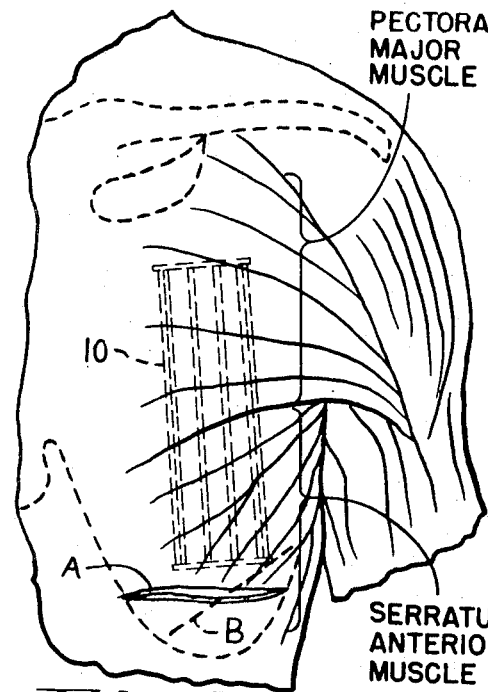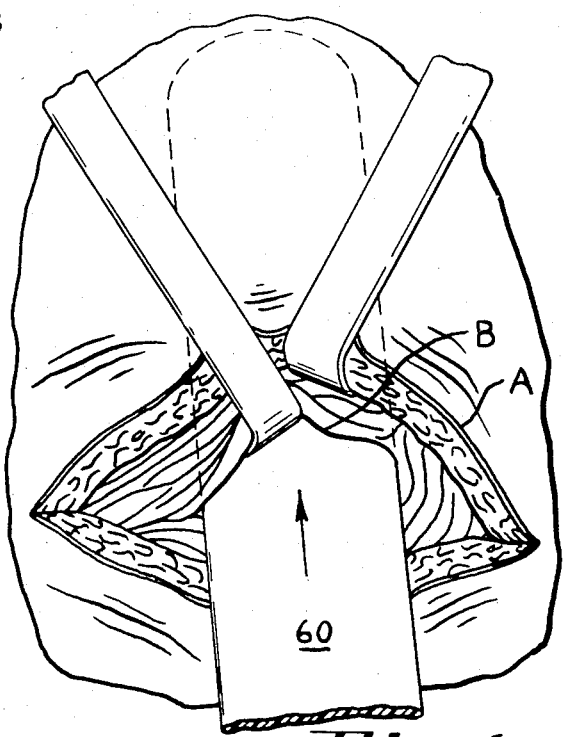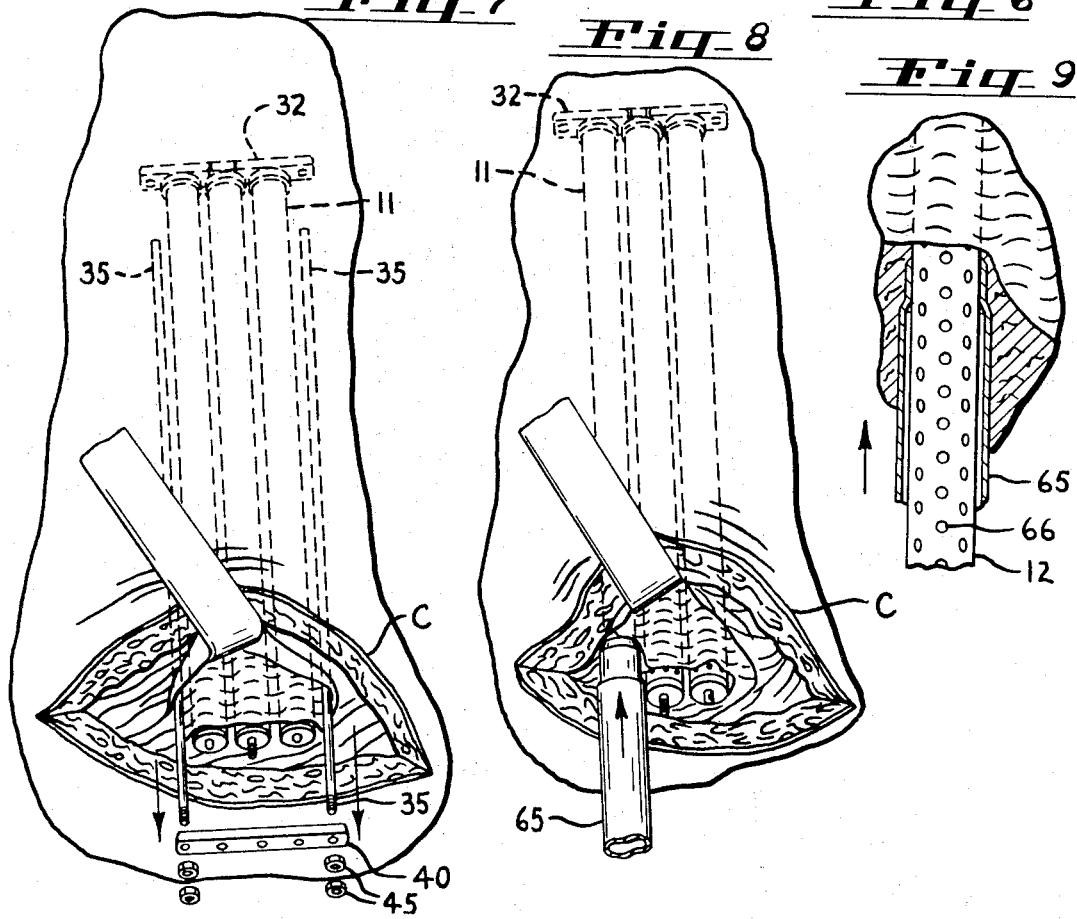

METHOD OF MAKING CLOTH REINFORCING MEMBER FOR TISSUE GRAFTS

CROSS REFERENCE TO RELATED APPLICATIONS

This application is a division of Ser. No. 178,171 filed Sept. 7, 1971, now U.S. Pat. No. 3,703,009 which is a division of Ser. No. 823,287 filed May 9, 1969, now U.S. Pat. No. 3,625,198, which is a continuation-in-part of Ser. No. 655,838 filed July 25, 1967, now U.S. Pat. No. 3,514,791.

BACKGROUND OF THE INVENTION

This invention relates to a novel method for growing tissue grafts and has particular reference to an improved cloth reinforcing member for tissue grafts and method of making same.

My prior U.S. Pat. No. 3,514,791 discloses a number of individual dies for growing grafts for different purposes. It is often desired to grow a plurality of grafts at the same time, as, for example, when a graft tube is needed of greater length than can be provided in a single implantable die. Also, the need may arise to grow different sizes or types of grafts simultaneously.

Further, an improved technique for implantation is desired. It would be advantageous to obviate the necessity for tying the die or dies to the bone structure of the body and to provide a method of implantation which would not require a large incision.

Objects of the invention are, therefore, to provide an improved tissue graft, to provide an improved cloth reinforcement for a tissue graft, to provide an improved arrangement of a cloth reinforcement within a die cavity, and to provide an improved method of preparing the cloth reinforcement.

SUMMARY OF THE INVENTION

According to the present invention a cloth reinforcing member is impregnated with a stiffening agent so that the cloth may be pre-shaped and will maintain itself in a position in a die cavity where it will be located adjacent the outer surface of the graft tissue. When a plurality of grafts are needed, a number of dies are assembled in a die cluster for implantation as a unit.

Instead of tying the die or die cluster to the rib cage to avoid movement in the body, it is inserted under a layer of muscles overlying the rib cage. The muscles themselves hold the die or die cluster in fixed position against the ribs whereby the dies are easily insertable and removable through a relatively small incision.

Other objects and advantages will become apparent and the invention will be better understood with reference to the following description of the preferred embodiment illustrated in the accompanying drawings. Various changes may be made, however, in the details of the method and in the form of construction of the dies and certain features may be used without others. The invention is of particular advantage in growing autogenous grafts within the body of the same patient who is to receive the grafts but the invention may also be used in growing homografts and heterografts if desired.

BRIEF DESCRIPTION OF THE DRAWINGS

FIG. 1 is a perspective view of a die cluster embodying the principles of the invention;

FIG. 2 is an exploded view of the die cluster in FIG. 1 with parts removed and parts broken away;

FIG. 3 is a sectional view on the line 3—3 in FIG. 1;

FIG. 4 is a sectional view on the line 4—4 in FIG. 1;

FIG. 5 is a fragmentary front elevation view of a patient, showing the die cluster of FIG. 1 implanted;

FIG. 6 is an enlarged view of a portion of FIG. 5 showing the use of a pathfinder for preparing an opening to receive the die cluster;

FIG. 7 is a view similar to FIG. 6 showing a first step in the removal of the dies;

FIG. 8 is a view similar to FIG. 7 showing a subsequent step in removal of the dies;

FIG. 9 is an enlarged view of a portion of FIG. 8 with parts in section;

DESCRIPTION OF THE PREFERRED EMBODIMENT

Figure 10:
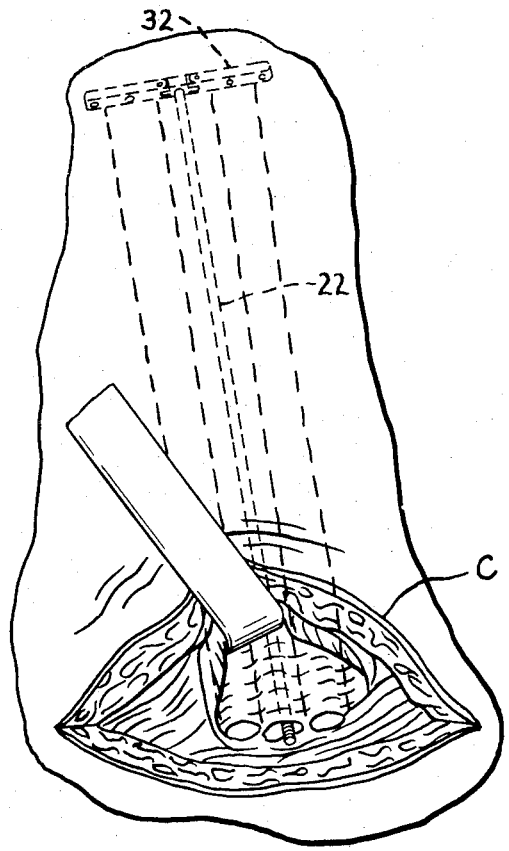
FIGS. 10 and 11 are views similar to FIGS. 7 and 8 showing subsequent steps in removal of the die cluster.

FIG. 1 shows a die cluster 10 containing a plurality of dies 11 for implantation as a unit. By way of example, tubular dies are illustrated for growing artery grafts and the like. Each die comprises essentially an outer cylindrical metal tube 12 containing perforations 13 and an inner cylindrical metal mandrel 14 of smaller diameter. The annular space between the outer surface of the mandrel and the inner surface of tube 12 forms a die cavity 15 for growing a tube graft. Tube 12 and mandrel 14 may be made of a suitable plastic if desired.

Each tube 12 and mandrel 14 is supported at its front end on a plastic ferrule 20 and at its rear end on a plastic ferrule 21. In the middle die of the cluster these ferrules are mounted on an anchor rod 22 while in the two outside dies the ferrules are mounted on removable rods 23. The two ferrules 21 on rods 23 are secured thereto by pins 24 while the other ferrules are not attached to their supporting rods. Each ferrule has a stepped end flange portion 25 to support tube 12 and an interior shoulder portion 26 supporting mandrel 14 in concentric position within tube 12. Flange 25 on each ferrule 20 has the same diameter as the outside diameter of tube 12 while flange 25 on each ferrule 21 is of larger diameter for a purpose which will presently appear.

Mounted on the rear end of anchor rod 22 is a head 30 having hinge pins 31 for pivotal connection with cross bars 32. The outer end of each cross bar 32 is provided with a threaded hole 33 and its intermediate portion is provided with a smooth hole 34. The rear ends of rods 23 are received in the holes 34 and a pair of tie rods 35 have threaded engagement with the end holes 33.

The assemblage thus far described is retained in the cluster by a front cross bar 40. Cross bar 40 has a central hole 41 to receive anchor rod 22, end holes 42 to receive tie rods 35, and intermediate holes 43 to receive the removable rods 23, all of these holes being smooth bore. The front ends of rods 22 and 35 are threaded at 44 to receive nuts 45. Nuts 45 hold all the parts in place and immobilize the hinged joints at 31 to form a rigid relatively flat unit for implantation. Cross bars 32 and 40 and rods 22 and 35 form a frame or die holder which contains the dies 11 in side by side relation.

In order to prevent adherence of the graft to the mandrel 14 the outer surface of the mandrel is preferably coated with a suitable release agent such as Dow Corning resin R–671 or Teflon. To strengthen the graft, a cloth reinforcing member 50 is inserted in die cavity 15.

Reinforcing member 50 is preferably made of woven or knitted seamless tubular construction having such diameter that it will lie against or substantially adjacent outer tube 12 in spaced relation to mandrel 14. The structural advantages and disadvantages of both woven and knitted materials are well understood by persons skilled in the art. Tube 50 is preferably made of a suitable synthetic fiber such as Dacron. This reinforcement is most effective to prevent leakage or rupture of the graft under arterial blood pressure if the reinforcement is located adjacent the outer surface of the graft tube and relatively remote from the inner surface or lumen.

In order to make the cloth tube 50 support itself and lie substantially smoothly against the inside of tube 12, the cloth is preferably impregnated with a suitable stiffening agent such as silicone rubber. A preferred procedure is to dip the tube several times in a 1:5 suspension of crude (unvulcanized) silicone rubber in xylene. The tube is hung to dry between dips. It is then stretched on a suitable mandrel such as a glass rod having a diameter equal to the inside diameter of tube 12 and vulcanized in stretched condition on the glass rod. This accomplishes a desirable sizing operation. When the vulcanized cloth tube is removed from the glass rod it holds its diameter, and when installed in the die it automatically positions itself snugly against the inner surface of tube 12. Impregnation and vulcanization in the manner described also causes the cloth tube to hold its length and causes the junctures of the threads to become locked together, both of which stabilizing factors are especially advantageous with a knitted type of cloth.

Before implantation of the die cluster the die cavities are preferably filled with a suitable nutrient. A preferred method of preparing the nutrient will be described. The quantities given in the following example are not intended to limit the invention but will serve to define the preferred proportions of the ingredients used. First, 50 cc. of the patient's blood is drawn from a vena-puncture into a syringe containing 2cc. of a solution of one million units of penicillin and one gram of streptomycin dissolved in 20 cc. of normal saline solution. Then an assembled and sterile die cluster as shown in FIG. 1 is placed in a metal laboratory boat and covered with the blood solution just described. The die cluster is allowed to remain in the blood solution for about 25 minutes so that a strong, firm clot forms, filling the die cavities 15.

FIGS. 5 and 6 illustrate the method of implantation of the prepared die cluster. A transverse incision A is made in the skin immmediately above the costal margin across the mid-clavicular line as shown in FIG. 5. This incision is carried down to the serratus anterior muscle. If the patient is right-handed this incision is made on the left side, as shown; if the patient is left-handed the incision would be on the right side. In instances where two long graft tubes are needed, a die cluster is implanted on each antro-lateral chest wall.

After incision A has been made in the skin, the serratus anterior muscle is incised in the direction of its fibers as indicated at B in FIG. 5. A flat spatula-shaped pathfinder 60 is inserted and passed on the rib cage supero-medially, aiming at the junction of the middle and medial thirds of the clavicle as shown in FIG. 6. In the proximal one-half of the passage considerable resistance is met as a result of the origins of the serratus anterior muscle. These must be pushed forcefully off the ribs. Essentially no resistance is met as the instrument passes beneath the pectoralis major muscle in the upper half of the passage. Then the pathfinder 60 is withdrawn.

The die cluster 10 prepared as above described is lifted from the boat and the back end having the jointed cross bar 32 is inserted in the same manner as pathfinder 60 in FIG. 6. The die cluster is pushed up along the path made by pathfinder 60 until the lower end of the die cluster lies above incision A as shown in FIG. 5. Finally, the incision is closed in layers using interrupted sutures and a light sterile dressing is applied. The patient is maintained on penicillin and streptomycin until hospital discharge. The patient is normally discharged from the hospital one or two days after implantation of the dies and resumes normal activity. The die cluster may be made to contain fewer or more than three dies if desired.

The serratus anterior muscle and the pectoralis major muscle clamp the die cluster firmly and rigidly against the ribs and prevent any movement of the die cluster, making it unnecessary to provide any mechanical attachment to the ribs. This makes it possible to insert and remove the die cluster endwise through a relatively small incision which heals quickly. While the die cluster is implanted, body tissue from the patient grows through holes 13 into the die cavity replacing the blood nutrient and encapsulating the reinforcing cloth tube 50. This ingrowth of tissue through cloth tube 50 completely fills the die cavity and forms the ultimate graft. Mandrel 14 casts a smooth surface on the lumen of the graft tube.

Two or three months later the patient is re-admitted to the hospital for the grafting procedure. The grafts are usually complete in two months and are consistently complete at 3 months. The procedure for removing the dies is shown in FIGS. 7 to 11. A three inch incision C is made over the lower end of the die cluster and perpendicular to its long axis. This incision is carried down through the muscle to the dies. Lower cross bar 40 and the lower 1 cm. of the dies are exposed by sharp dissection. Nuts 45 are removed and cross bar 40 is removed as shown in FIG. 7, and tie rods 35 are unscrewed from threaded holes 33 in hinged cross bar 32.

Then a cylindrical cutter 65 is passed onto the exposed end of a die and, using a rotary oscillating motion, is passed up over the entire length of the die as shown in FIGS. 8 and 9. The larger diameter flanges 25 on plastic ferrules 21 provide stops for the cutter. This operation severs the necks of tissue 66 which have ingrown through the holes 13 in tube 12. The cutter and die are then removed and the die containing the graft is removed from the cutter. The remaining two dies are removed in the same manner. In removing the dies, rods 23 come out with the dies while anchor rod 22 remains in the patient.

Figure 11:
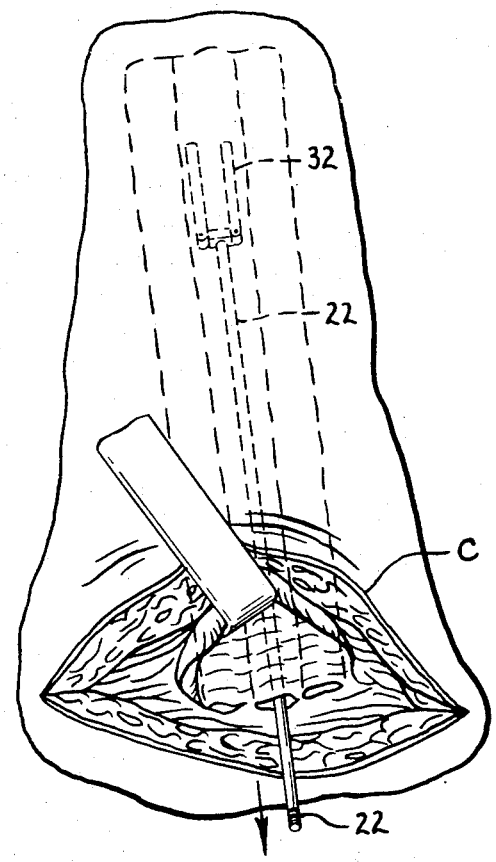

At this stage only the center anchor rod 22 and the upper jointed cross bar 32 remain in the patient as shown in FIG. 10. These parts are removed by firm traction on the anchor rod as shown in FIG. 11, causing the ends of cross bar 32 to pivot back to trailing position, as shown. Incision C is closed in layers using interrupted silk sutures.

Using a surgical knife, the outer surface of each tube 12 is completely cleansed of all fragments of tissue and the mandrel 14 is extracted from each die. This is done by pushing the mandrel from one end to expose its other end which is then grasped with a small hemostat and extracted.

Figure 12:
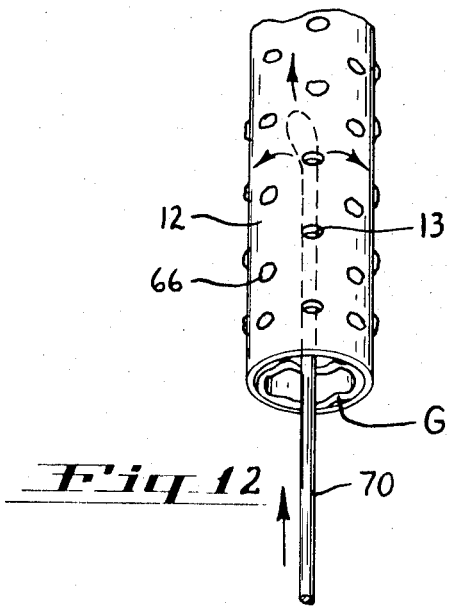
FIG. 12 is a fragmentary perspective view showing a preliminary step in removal of a graft from a die.
Figure 13:
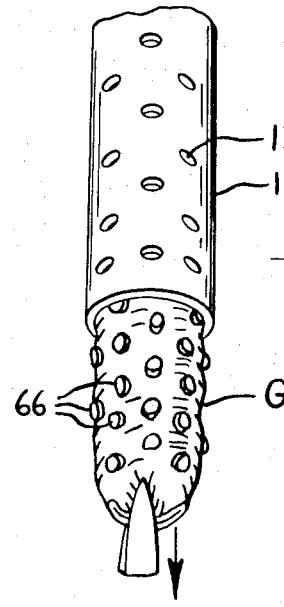
FIG. 13 is a similar view showing the final step in removal of a graft from a die.

A gall bladder probe 70 is then passed between the graft G and the inner surface of tube 12 at several points around the circumference as shown in FIG. 12. With each pass, it is passed throughout the length of the die, releasing the graft from the outer tube by withdrawing the necks of tissue 66 inwardly through the holes 13. After the graft is completely freed from tube 12 in this manner, it may be grasped at one end with a hemostat and extracted as shown in FIG. 13.

When a long graft tube is needed, the individual grafts from the three dies may be sutured together end to end over a glass rod, the ends of the grafts preferably being cut on a 45° angle for each anastomosis. In this manner a graft tube approximately 19 inches long may be made.

When only a short graft is needed, a single die similar to the central die is used with a modified form of die holder. In such case, cross bar 40 and hinged cross bars 32 are made shorter and holes 34 and 43 are omitted. This makes a narrower and more compact unit placing the tie rods 35 adjacent opposite sides of the single die on anchor rod 22. When the die is round, the die holder prevents rotation in the body. When the die and die holder are of small size, the unit may simply be inserted in a stab wound directed as explained in connection with FIGS. 5 and 6.

The invention is not limited to tube grafts. Dies for other graft members may also be implanted essentially as described in connection with FIGS. 5 and 6. When the die is not round, the die holder may be eliminated if desired but a die holder may still be desirable for convenience in handling a single die or cluster of dies.

Having now described my invention and in what manner the same may be used, what I claim as new and desire to protect by Letters Patent is:

1. The method of making a graft reinforcement for ingrowth and encapsulation by living tissue to form a living tissue graft, comprising dipping a cloth tube several times in a liquid suspension of unvulcanized silicone rubber, hanging said tube to dry after each of said dips, stretching said dipped and dried tube on a rigid cylindrical mandrel, vulcanizing said rubber while said tube is stretched on said mandrel so that said cloth remains capable of penetration and ingrowth through the cloth by said living tissue after said vulcanization of the rubber, and then removing said mandrel.

* * * * *